United States Patent [19]

Stenkvist

[11] 4,356,340
[45] Oct. 26, 1982

[54] DC ARC FURNACE HAVING A SHIELDED ARC

[75] Inventor: Sven-Einar Stenkvist, Västerås, Sweden

[73] Assignee: ASEA Aktiebolag, Västerås, Sweden

[21] Appl. No.: 129,261

[22] Filed: Mar. 11, 1980

[30] Foreign Application Priority Data

Mar. 12, 1979 [SE] Sweden .............................. 7902178
Oct. 9, 1979 [SE] Sweden .............................. 7908349

[51] Int. Cl.³ .......................................... H05B 7/00
[52] U.S. Cl. .................................. 373/107; 373/103; 373/108
[58] Field of Search ................ 13/11, 12, 35; 219/123

[56] References Cited

U.S. PATENT DOCUMENTS

| | | | |
|---|---|---|---|
| 4,016,355 | 4/1977 | Stenkvist | 13/11 |
| 4,034,146 | 7/1977 | Stenkvist | 13/11 |
| 4,038,483 | 7/1977 | Stenkvist | 13/11 |
| 4,149,024 | 4/1979 | Stenkvist et al. | 13/11 |
| 4,228,314 | 10/1980 | Stenkvist | 13/35 |

*Primary Examiner*—Bernard Roskoski
*Attorney, Agent, or Firm*—Kenyon & Kenyon

[57] ABSTRACT

A DC arc furnace has shielding between the arc and its power lines preventing or retarding the magnetic field created by the power lines from deflecting the arc.

6 Claims, 4 Drawing Figures

DC ARC FURNACE HAVING A SHIELDED ARC

BACKGROUND OF THE INVENTION

A DC arc furnace characteristically has a refractory side wall and a hearth containing the melt being worked in the furnace. A melt connection extends through the hearth or a side pocket to the melt and an arcing electrode is positioned vertically above the hearth. DC powered power lines or conductors connect to the melt connection and the arcing electrode to power an arc struck between the arcing electrode and the melt. The arcing electrode is usually of the graphite type, and to obtain a smoother arc and less electrode wear, the electrode can be operated cathodically with the melt forming an anode.

The side wall conventionally is cylindrical with the hearth, circular in contour in the horizontal direction, and the arc is positioned vertically, concentrically with respect to the hearth and side wall.

When the melt connection is horizontally offset as via a side pocket, the arc undesirably deflects angularly with respect to the arcing electrode, but this can be corrected partially, if not completely, by arranging the melt connection's power line so that its incidental magnetic field is directed to force the arc to work vertically in alignment with the arcing electrode, this being desirable from the viewpoint of reduced side wall wear. An example of this is provided by the Stenkvist U.S. Pat. No. 4,038,483, July 26, 1977.

A horizontally offset melt connection requires the furnace side wall to be constructed to accommodate the melt connection, but is sometimes desirable to use a more conventional side wall construction.

Arc deflection should not seem to be expected if the melt connection is built through the hearth directly below the arcing electrode, and this has been made practical via the Stenkvist U.S. Pat. No. 4,145,562, Mar. 20, 1979, and the Stenkvist U.S. patent application Ser. No. 15,587 filed Feb. 27, 1979, now U.S. Pat. No. 4,228,314, Oct. 14, 1980.

However, the power source for a DC furnace is usually an AC to DC rectifier which for convenience is positioned horizontally offset from the furnace with the power lines extending transversely with respect to the furnace and horizontally from the rectifier to the melt connection at a level close to the level of the hearth, and to the arcing electrode at a higher level. The required arcing power is high, and these power lines or conductors have been found to create magnetic fields strong enough to cause the arc to deflect angularly even when the melt connection is vertically aligned with the arcing electrode.

BRIEF SUMMARY OF THE INVENTION

The present invention concerns such a DC arc furnace installation, namely, one having the melt connection positioned vertically below the arcing electrode and with a horizontally offset DC power source, normally a rectifier, positioned horizontally offset from the outside of the furnace with the power lines extending from the power source to the melt and arcing electrode connections via power lines extending horizontally and transversely with respect to the furnace so as to create the magnetic fields normally causing angular deflection of the arc. The power lines are positioned horizontally at least where they are adjacent to the furnace, and at least in the case of the melt connection. An arc furnace usually has a removable roof which is removed for initially charging the furnace hearth and the arcing electrode must be vertically moved when the furnace is in operation. Therefore, the arcing electrode power line may be in the form of a flexible section at least immediately adjacent to the furnace and in such a case its magnetic field may not so noticeably affect the arc. However, the hearth connection power line remains to cause arc deflection trouble.

To prevent either or both power lines from causing arc deflection via their incidental magnetic fields, the present invention provides magnetic shielding so as to at least reduce the arc angularity of deflection caused by the power line fields.

Such shielding is provided by an arcuate magnetic metal shield which partly encircles the furnace side wall and which is preferably as high as the side wall, this shield being symmetrically arranged with respect to the power lines and the arcing electrode and its arc. The balance of the furnace wall is unshielded or, in other words, the shield is positioned mainly only between the arc and the power lines extending transversely from the furnace.

Details of the invention are illustrated by the accompanying drawings and described by the following explanation of the details.

DESCRIPTION OF THE DRAWINGS

These drawings are all schematic, the various views being as follows:

FIG. 2 is like FIG. 1 but shows another form of the invention; and

DETAILED DESCRIPTION OF THE INVENTION

Figure 1:
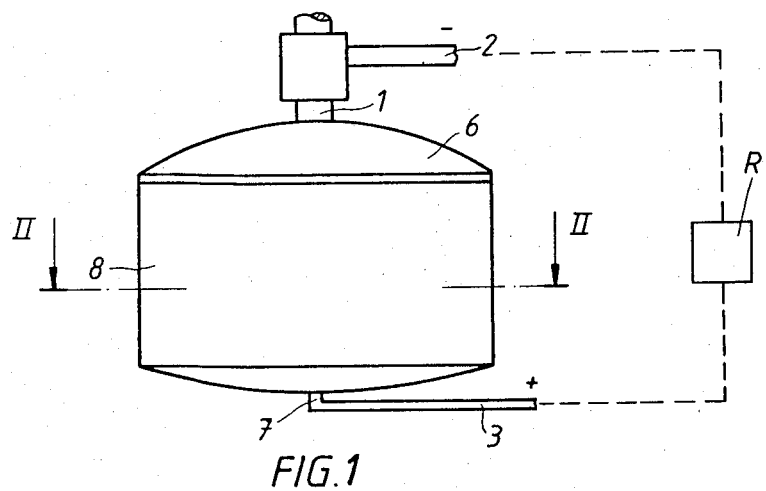
FIG. 1 is a side elevation of a DC arc furnace incorporating one form of the invention.
Figure 2:
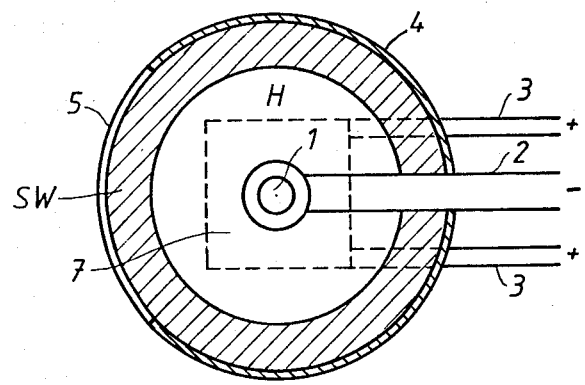
FIG. 2 is a cross section taken on the line II—II in FIG. 1.

In FIGS. 1 and 2 the arcing electrode is shown at 1 with its power line 2 extending horizontally to the negative side of the rectifier R and the melt connection power lines 3 extending to the positive side of the rectifier. Both lines or conductors 2 and 3 are illustrated as extending horizontally and transversely with respect to the furnace with the rectifier R horizontally offset from the outside of the furnace. As previously noted, the conductor 2 may not be exactly as illustrated in the case of a working furnace installation.

The usual refractory side wall is indicated by the letter SW and this side wall is encased by a metal cylindrical shell.

The difference between the conventional steel shell and the shell used in this instance is that this shell has an arcuate portion 4 made of magnetic metal such as the usual magnetic steel plate construction, but the balance of the shell shown at 5 is made of non-magnetic metal such as one of the non-magnetic stainless steels.

It is the magnetic shell portion 4 that functions as the shield which largely, if not completely, shields the arc formed by the electrode 1 from the magnetic field of at least the conductor 3, and the conductor 2, if it is oriented as illustrated. This shielding reduces or eliminates angular deflection of the arc such as would otherwise be caused by the conductor fields.

The side wall and its metal shell are cylindrical and concentrically arranged with respect to the arcing electrode 1. This electrode is vertically movable through the usual bushing (not shown) in the removable furnace roof 6, and the melt connection 7 is itself positioned symmetrically with respect to the side wall and shell and is in vertical alignment with the electrode 1. In this case the melt connection 7 encompasses a substantial area of the hearth 4 because it may be of the type disclosed by the previously-mentioned Stenkvist application. It is for this reason that two conductors 3 are illustrated as extending from the external terminals (not shown) of the melt connection 7.

The semicylindrical magnetic shell portion 4 should extend symmetrically with respect to the conductors 3, and possibly the conductor 2, and for maximized effectiveness should extend for more than 180° around the furnace side wall, but it should not extend completely around the side wall. Depending on design, the shield 4 may completely correct the arc deflection or angularity trouble, but is not, the complete bottom of the furnace may be made of non-magnetic material and magnets (not shown) may be positioned below this bottom for complete vertical alignment of the arc with the vertical electrode 2, as suggested by the previously mentioned Stenkvist U.S. Pat. No. 4,038,483.

The theory of operation is believed to be that the shield 4 acts to, in effect, short circuit the field or fields created by the power lines or conductors. Possibly the shield itself creates an asymmetrical magnetic field counteracting the power line fields. But, in any event, the normally to be expected arc deflection does not result. The shield 4 is effective as shielding against the magnetic fields of the power lines.

Usual arc furnace construction involves a side wall shell that is completely made of magnetic steel, but the principles of this invention are applicable if the power lines affect the arc, as explained below.

Figure 3:
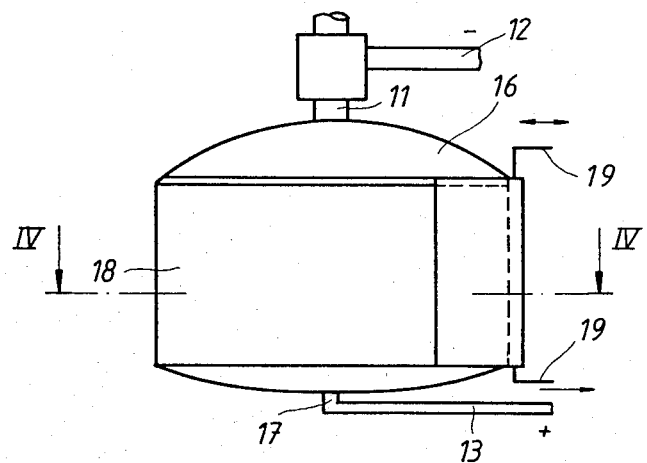
Figure 4:
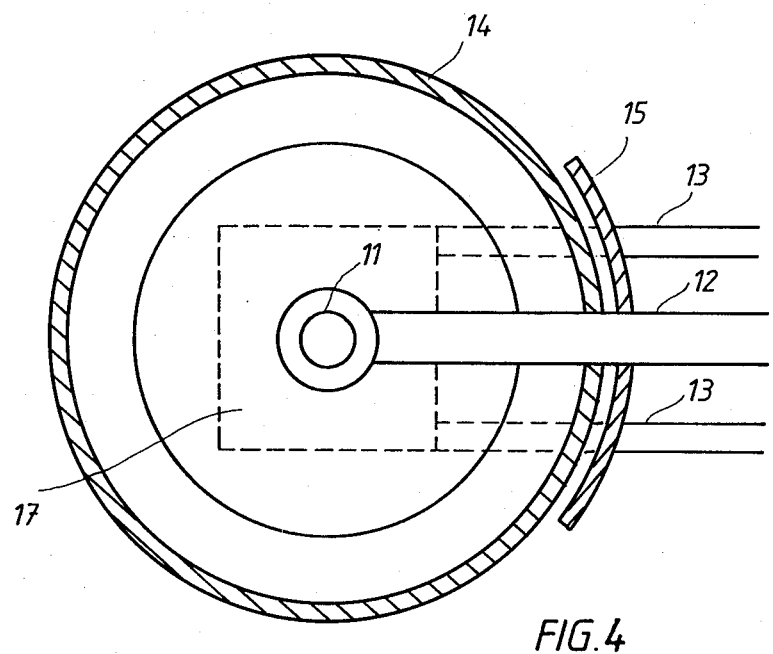
FIG. 4 is a cross section taken on the line IV—IV in FIG. 3.

In FIGS. 3 and 4, the parts are numeraled as in FIG. 1, but with the numbers multiplied by ten. In this case the shield 15 is overlaid on the outside of a completely magnetic steel shell 14 and is spaced from the furnace shell 14 while being arranged symmetrically with respect to the conductors 12 and 13, and in arcuate form is concentric with respect to the arcing electrode 11. The shield 15 can be mounted separately from the furnace via schematically shown supports 19 which can be adjustable radially with respect to the furnace, as indicated by the arrows in FIG. 3.

This arcuate magnetic metal shield 15 should extend for from about one-tenth to about one-half the circumference of the magnetic shell 14 and, of course, symmetrically to either side of the power lines in the horizontal direction. The shield 15 can be isolated from the magnetic metal shell 14 and may be made of magnetic steel plate. Its shape may be somewhat different from that illustrated where it is truly arcuate, providing its shielding action is not deleteriously affected. This shielding action is believed to involve the previously indicated theory of operation.

Because arc furnaces are usually of the tilting type for deslagging and tapping operations, it is appropriate to remark that when the furnace illustrated is in normal operation, the power lines 3 and 13 extend horizontally and transversely with respect to the furnace in the manner illustrated.

What is claimed is:

1. A DC arc furnace comprising a furnace vessel having a side wall and a hearth containing a melt, a melt connection through the hearth, an arcing electrode above the hearth, said melt connection being positioned vertically below said arcing electrode, DC powered conductors connecting to the melt connection and arcing electrode, the conductor connecting to the melt connection extending horizontally beneath the hearth from the melt connection away from the furnace transversely with respect to the side wall, the conductors powering an arc between the arcing electrode and melt and at least the conductor connecting to the melt connection forming a magnetic field capable of causing the arc to have an angularity with respect to the arcing electrode, and means for forming a magnetic metal shield surrounding only a portion of the side wall and on its side from which extends the conductor connecting with the melt connection so as to at least reduce said angularity.

2. The furnace of claim 1 in which said side wall is enclosed by a metal shell and said means is provided by the shell having a circumferential portion between said field and said arc made of magnetic metal and the balance of the shell made of non-magnetic metal.

3. The furnace of claim 2 in which said portion extends for at least 180° of the shell's circumference.

4. The furnace of claim 1 in which said side wall is enclosed by a magnetic metal shell and said means is provided by the shell having a circumferential portion overlaid by a magnetic metal shield on the outside of the shell and positioned between said field and the arc.

5. The furnace of claim 4 in which said shield extends around said shell for from 1/10 to ½ its circumference.

6. The furnace of any one of claims 1, 2, 3, 4 or 5 in which said side wall and said hearth are circular in contour symmetrically with respect to each other, said arcing electrode and said melt connection are positioned on the axis of the side wall and hearth, and said portion providing said means extends symmetrically with respect to said axis and equally on either side of said conductor connecting with said melt connection.

* * * * *